(12) United States Patent
Pagano et al.

(10) Patent No.: US 11,115,431 B2
(45) Date of Patent: Sep. 7, 2021

(54) IDENTIFYING NETWORK VULNERABILITIES

(71) Applicant: Rapid7, Inc., Boston, MA (US)

(72) Inventors: Justin Pagano, Cambridge, MA (US); Roy Hodgman, Cambridge, MA (US)

(73) Assignee: Rapid7, Inc., Boston, MA (US)

( * ) Notice: Subject to any disclaimer, the term of this patent is extended or adjusted under 35 U.S.C. 154(b) by 424 days.

(21) Appl. No.: 16/152,519

(22) Filed: Oct. 5, 2018

(65) Prior Publication Data

US 2020/0112583 A1    Apr. 9, 2020

(51) Int. Cl.
| | |
|---|---|
| *H04L 29/06* | (2006.01) |
| *G06K 9/62* | (2006.01) |
| *G06N 3/02* | (2006.01) |
| *H04L 12/24* | (2006.01) |

(52) U.S. Cl.
CPC ........ *H04L 63/1433* (2013.01); *G06K 9/6269* (2013.01); *G06N 3/02* (2013.01); *H04L 41/0866* (2013.01); *H04L 63/1425* (2013.01); *H04L 63/20* (2013.01)

(58) Field of Classification Search
CPC . H04L 63/1433; H04L 63/1425; H04L 63/20; H04L 41/0866; G06K 9/6269; G06N 3/02
USPC .......................................................... 726/25
See application file for complete search history.

(56) References Cited

U.S. PATENT DOCUMENTS

| | | | |
|---|---|---|---|
| 2017/0046519 A1* | 2/2017 | Cam ...................... | G06N 7/005 |
| 2019/0050578 A1* | 2/2019 | Choi ..................... | G06F 21/577 |
| 2019/0068650 A1* | 2/2019 | Castel ................... | H04L 63/205 |

* cited by examiner

*Primary Examiner* — Evans Desrosiers
(74) *Attorney, Agent, or Firm* — Ashwin Anand

(57) ABSTRACT

Methods and systems for identifying a network vulnerability. The system may gather data regarding a new or previously unknown network device, and compare the gathered data to one or more known devices that are scanned by a vulnerability assessment device. The vulnerability assessment device may then scan the previously unknown device upon a processor determining the previously unknown device shares at least one feature with a known device that is scanned.

18 Claims, 3 Drawing Sheets

IDENTIFYING NETWORK VULNERABILITIES

TECHNICAL FIELD

Embodiments described herein generally relate to systems and methods for identifying network vulnerabilities and, more particularly but not exclusively, to systems and methods for identifying network vulnerabilities by scanning previously-unknown network devices.

BACKGROUND

Existing vulnerability assessment products are generally tasked with scanning network devices or addresses to identify network vulnerabilities. Often times, however, existing vulnerability assessment products are simply unaware that certain network devices exist and should be scanned.

For example, network devices may actively try to avoid being identified. Or, existing vulnerability assessment products may not be aware that certain devices and/or IP address ranges have been added to a network. If these devices/IP addresses are unknown and therefore not scanned, their network vulnerabilities may ultimately compromise network security.

A need exists, therefore, for systems and methods for identifying network vulnerabilities that overcome the disadvantages of existing vulnerability assessment products.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for identifying a network vulnerability. The method includes receiving, using an interface, scan configuration data from a vulnerability assessment device, wherein the scan configuration data includes at least one device that is known to the vulnerability assessment device, whether the at least one known device is scanned by the vulnerability assessment device, and at least one feature related to the at least one known device; receiving, using the interface, network activity data including at least one device that is unknown to the vulnerability assessment device; determining, using a processor executing instructions stored on a memory and providing a classifier, whether the at least one unknown device shares at least one feature with a known device that is scanned; and scanning, using the vulnerability assessment device, the at least one unknown device to identify any vulnerabilities of the at least one unknown device after the processor determines the at least one unknown device shares at least one feature with a known device that is scanned.

In some embodiments, the at least one feature includes at least one of a set of ports receiving data on the at least one known device, a number of peers connected to the at least one known device, a volume of data sent from the at least one known device, a volume of data received by the at least one known device, a busiest time period of day, and a least busy time period of day.

In some embodiments, the method further includes updating the scan configuration data in a disabled state and presenting the updated scan configuration data to an operator using a user interface before the vulnerability assessment device scans the at least one unknown device.

In some embodiments, the network activity data is received from at least one of a Netflow record, an address resolution protocol announcement, a web proxy, a domain name server, and a firewall.

In some embodiments, at least one device that is not scanned includes a printer.

In some embodiments, at least one device that is not scanned includes a healthcare device.

In some embodiments, the method further includes iterating, at a predetermined time interval, the steps of receiving scan configuration data, receiving network activity data including at least one unknown device, determining whether the at least one unknown device shares at least one feature with at least one known device that is scanned, and scanning the at least one unknown device to identify any vulnerabilities of the unknown device.

In some embodiments, the classifier includes at least one of a random forest classifier, a support vector machine classifier, decision trees, Bayesian networks, neural networks, and logistic regression techniques.

In some embodiments, the method further includes issuing an alert using a user interface, wherein the alert indicates that the scan configuration data should be updated to include the at least one unknown device.

In some embodiments, the method further includes autonomously updating the scan configuration data to include the at least one unknown device.

According to another aspect, embodiments relate to a system for identifying a network vulnerability. The system includes an interface for receiving scan configuration data from a vulnerability assessment device, wherein the scan configuration data includes at least one device that is known to the vulnerability assessment device, whether the at least one known device is scanned by the vulnerability assessment device, and at least one feature related to the at least one known device; and network activity data including at least one device that is unknown to the vulnerability assessment device; and a processor executing instructions stored on a memory and providing a classifier, wherein the processor is configured to determine whether the at least one unknown device shares at least one feature with at least one known device that is scanned, wherein the vulnerability assessment device is configured to scan the unknown device to identify any vulnerabilities of the at least one unknown device after the processor determines the at least one unknown device shares at least one feature with a known device that is scanned.

In some embodiments, the at least one feature includes at least one of a set of ports receiving data on the at least one known device, a number of peers connected to the at least one known device, a volume of data sent from the at least one known device, a volume of data received by the at least one known device, a busiest time period of day, and a least busy time period of day.

In some embodiments, the processor is further configured to update the scan configuration data in a disabled state and present the updated scan configuration data to an operator using a user interface before the vulnerability assessment device scans the at least one unknown device.

In some embodiments, the network activity data is received from at least one of a Netflow record, an address resolution protocol announcement, a web proxy, a domain name server, and a firewall.

In some embodiments, at least one device that is not scanned includes a printer.

In some embodiments, at least one device that is not scanned includes a healthcare device.

In some embodiments, the system is configured to, at a predetermined time interval, receive scan configuration data, receive network activity data including at least one unknown device, determine whether the at least one unknown device shares at least one feature with a known device that is scanned, and scan the at least one unknown device to identify any vulnerabilities of the unknown device.

In some embodiments, the classifier includes at least one of a random forest classifier, a support vector machine classifier, decision trees, Bayesian networks, neural networks, and logistic regression techniques.

In some embodiments, the processor is further configured to issue an alert using a user interface, wherein the alert indicates that the scan configuration data should be updated to include the at least one unknown device.

In some embodiments, the processor is configured to autonomously update the scan configuration data to include the at least one unknown device.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
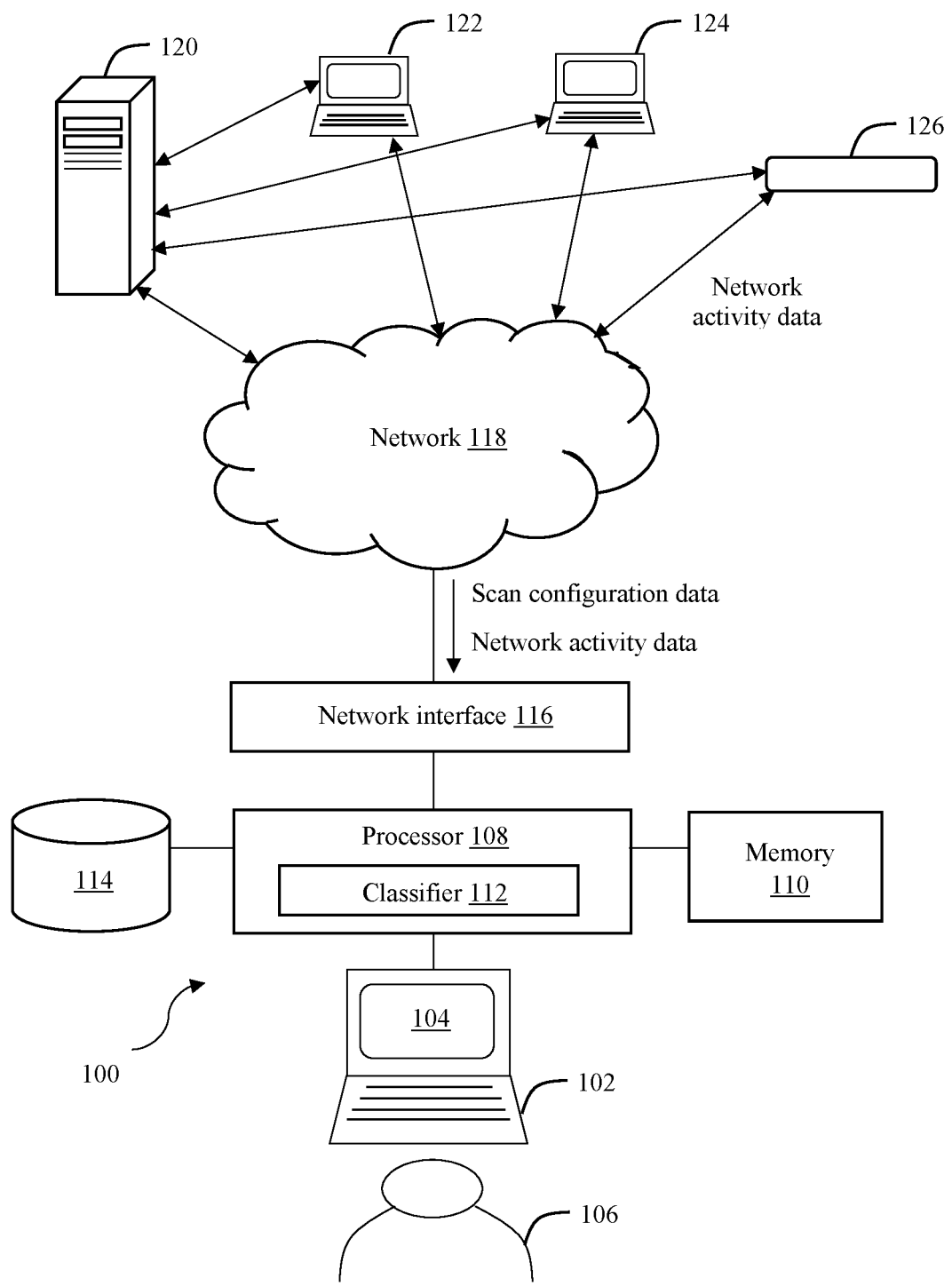
FIG. 1 illustrates a system for identifying a network vulnerability in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As discussed previously, vulnerability assessment products commonly scan network devices to identify network vulnerabilities. Existing vulnerability assessment products are generally able to scan devices they are instructed to scan. That is, given an IP range with x IP addresses and y devices present among those IP addresses (where y<=x), existing vulnerability assessment products are able to identify that each of they devices exist and gather an understanding of any vulnerabilities associated with those devices.

This assumes, however, that the devices are not actively trying to avoid detection or avoid being scanned. Also, often times a vulnerability assessment product may not be given an updated and accurate IP address range and a list of devices present. Accordingly, the vulnerability assessment product may simply be unaware of a network segment and/or network devices on the network segment.

For example, a network administrator may have recently added a network segment or a device to a network, and the vulnerability assessment product may not be configured to scan the recently-added segment and/or device. This ultimately leads to the recently-added segment and/or device going unscanned.

This may occur due to miscommunication between security teams and network administrators. That is, network administrators may modify a network by adding/reconfiguring network segments or devices. However, these modifications may not be communicated to or otherwise made known to security teams or vulnerability assessment products. Accordingly, existing scan configurations of vulnerability assessment products are often not updated to account for these segments or devices.

In fact, existing techniques for accounting for newly-added or reconfigured network segments generally rely on the manual creation of new scan configurations. Even with, for example, DHCP discovery connections, a new network segment can sometimes be managed by a new DHCP server that is unknown to network administrators and therefore a DHCP discovery connection would never be created. New devices in that particular network segment will therefore not be identified by the vulnerability assessment product. Additionally, new devices could be assigned static IP addresses and never interact with DHCP services provided by the network.

The systems and methods described herein therefore provide a vulnerability assessment device that can account for new network segments that may contain new IP addresses, devices, or assets. Additionally, the systems and methods described herein differentiate these new devices or assets (for simplicity, "devices") into those that should be scanned and those that should not be scanned.

For example, some devices are more likely to be compromised and therefore it is more important to scan them than to scan others. On the other hand, scanning certain types of devices may adversely affect the devices. For example, scanning certain devices such as Mill machines in healthcare settings may actually disrupt the device's normal operation and may even cause the device to crash or otherwise malfunction. Accordingly, the systems and methods described herein may distinguish between devices that should be scanned (i.e., included in a scan configuration) and devices that should not be scanned (i.e., excluded from a scan configuration).

FIG. 1 illustrates a system 100 for identifying a network vulnerability in accordance with one embodiment. The system 100 may include a user device 102 executing a user interface 104 to enable a user 106 to view data regarding various devices on a network as well as enter parameters regarding devices on the network (such as vulnerability assessment devices and devices to be scanned).

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to a user 106.

The user interface 104 may enable a user 106 such as a network security personnel to supply operational parameters to vulnerability assessment devices and to view data regarding network segments and devices on the network. The user interface 104 may further present data regarding one or more features related to the new/previously unknown devices, as well as features related to known scanned devices and known unscanned devices on the network.

The processor 108 may be any hardware device capable of executing instructions on memory 110 to identify a network vulnerability. The processor 108 may be a microprocessor, a field programmable gate array (FPGA), an application-specific integrated circuit (ASIC), or other similar device.

In some embodiments, such as those relying on one or more ASICs, the functionality described as being provided in part via software may instead be configured into the design of the ASICs and, as such, the associated software may be omitted. The processor 108 may be configured as part of the user device 102 on which the user interface 104 executes, such as a laptop, or may be located at some remote location.

The processor 108 may be further configured to execute a classifier 112 to classify new and previously unknown (for simplicity, "unknown") network devices as to whether or not they should be scanned. These classifications may be based on data stored in one or more databases 114 in communication with the processor 108.

The processor 108 may be in further communication with a network interface 116 that may receive scan configuration data from one or more networks 118 and one or more vulnerability assessment devices 120 on the network(s) 118. The network(s) 118 may link the various devices with various types of network connections. The network(s) 118 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 118 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The vulnerability assessment device 120 may communicate scan configuration data to the network interface 116. The scan configuration data may include data such as which devices the vulnerability assessment device 120 has scanned, as well as other parameters relating to the operation of the vulnerability assessment device 120. The vulnerability assessment device 120 may be similar to or otherwise incorporate Applicant's InsightVM vulnerability assessment tool or Applicant's NEXPOSE® vulnerability assessment tool, for example.

Accordingly, the vulnerability assessment device 120 may scan and obtain data regarding features of known network devices 122, 124, and 126. The vulnerability assessment device 120 may then communicate scan configuration data as well as other data to the network interface 116. This data may then be further communicated to the processor 108. Although not illustrated in FIG. 1, network activity data regarding devices unknown to the vulnerability assessment device 120 may also be communicated to the processor 108 for analysis (discussed below).

The systems and methods described herein therefore enable the vulnerability assessment device 120 to stay current with the state of changing networks and with minimal manual intervention. The systems and methods described herein leverage one or more data sources that each provide information about devices participating in network activity in order to update and/or create new scan configurations. Additionally, and as mentioned previously, the systems and methods described herein classify new devices as either devices to be scanned or devices to not be scanned.

Figure 2:
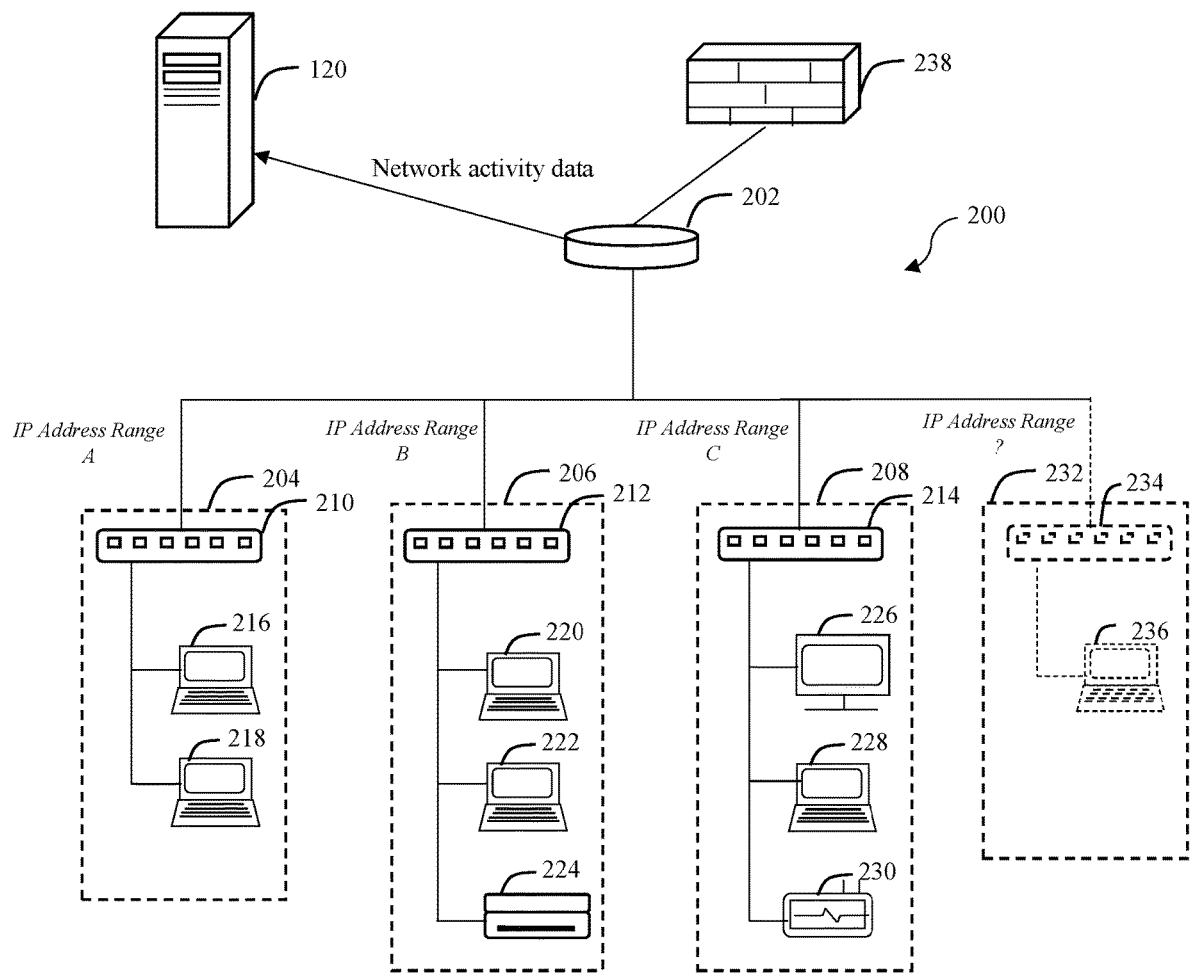
FIG. 2 illustrates a network with multiple network segments in accordance with one embodiment.

FIG. 2 illustrates the layout 200 of a network such as the network 118 of FIG. 1. The vulnerability assessment device 120 is seen in communication with a router 202 which is in further communication with known network segments 204, 206, and 208. In the context of the present application, the term "network segment" or "segment" may refer to a portion of a network that is separate from other portions of the network.

Network segments are generally separated by other portions of a network by a device such as a hub, bridge, or switch. Accordingly, the network segments 204, 206, and 208 include switches 210, 212, and 214, respectively. Generally, a range of IP addresses is assigned to each segment. Although the present application largely discusses the use of IPs for monitoring and detecting devices, other forms of device identification may be used in addition to or in lieu of IP addresses.

Network segment 204 may include, in addition to the switch 210, devices 216 and 218. These devices 216 and 218 may be laptops, for example. Although only two devices are shown as part of network segment 204, network segment 204 may include any number of devices as well as various other types of devices.

Network segment 206 may include, in addition to switch 212, devices 220, 222, and 224. Devices 220 and 222 may be laptops, and device 224 may be a printer. Although only three devices are shown as part of network segment 206, network segment 206 may include any number of devices as well as various other types of devices. In network segment 206, devices 220 and 222 may be frequently scanned, whereas device 224 may not be scanned as scanning may affect its operation.

Network segment 208 may include, in addition to switch 214, devices 226, 228, and 230. Device 226 may be a PC, device 228 may be a laptop, and device 230 may be a patient monitoring apparatus (e.g., in the healthcare context). Although only three devices are shown as part of network segment 208, network segment 208 may include any number of devices as well as various other types of devices. In this network segment 208, devices 226 and 228 may be frequently scanned, whereas device 230 may not be scanned as scanning may affect its operation.

The vulnerability assessment device 120 may also gather or otherwise obtain features related to the devices or the IP addresses on each segment. These features may include, but are not limited to, a set of ports receiving data on a device, the number of peers connected to a device, the volume of data sent by the device, the volume of data received by the device, the busiest time period of the day for the device, the least busy time period of the day for the device, or the like. Accordingly, the vulnerability assessment device 120 knows of the network segments 204, 206, 208, the IP address ranges of the segments 204, 206, and 208, and the devices on the segments 204, 206, 208.

FIG. 2 also shows that a new segment 232 has been added to the network. This new, previously unknown segment 232 may similarly include a switch 234 and at least one device 236. The vulnerability assessment device 120 or some other device such as the processor 108 may nonetheless learn of the new segment and devices thereon by relying on a variety of data sources for evidence of network activity relating to new segment 232. These data sources may include address resolution protocol (ARP) announcements, Netflow records, data from firewalls 238, DNS data, web proxy data, or the like.

The data gathered by the vulnerability assessment device 120 may then be communicated to the processor 108. The gathered data may include features related to each of the previously known and recently discovered network devices. This data may be gathered/communicated when prompted by a user, at predetermined time intervals, when an IP never-before seen in a local cache has been identified, or the like.

The processor 108 may then analyze received data regarding the recently discovered/previously unknown device(s) in conjunction with the IPs and devices already known by the system 100. The data regarding the devices and IPs already known by the system 100 may be stored in one or more databases 114, for example.

Specifically, the databases 114 may store data regarding whether or not the known devices have been scanned or are to be scanned, as well as features related to the known devices. The processor 108 may then execute instructions stored in memory 110 to train a classification model for execution by classifier 112.

The processor 108 may train the classifier 112 by first randomly creating test and training sets that use a "scan" or "do not scan" label. The processor 108 may train the classifier 112 using any suitable machine learning, binary classification techniques. For example, the classifier 112 may execute a model based on random forest, support vector machines, decision trees, Bayesian networks, neural networks, logistic regression, or some combination thereof. As mentioned above, the classifier 112 may be trained on data regarding known devices and, specifically, on whether the known device(s) are scanned and also the features such as those mentioned above.

In addition to or in lieu of machine learning, the classifier 112 may implement rules-based techniques. For example, existing scan configurations may have printers on an exclude/do not scan list. Because printers most likely receive data on port 9100, the classifier 112 may execute one or more rules to look for activity on an IP on port 9100, and classify any new IPs with activity on port 9100 as excludable (i.e., they will not be scanned).

Once trained, the classifier 112 may receive the data regarding new (i.e., previously unknown) IPs or devices. The classifier 112 may then analyze one or more features related to the new IPs/devices and, based on the data of the known devices, determine whether the new IPs/devices should be scanned.

This determination may be presented to the user 106 via the user interface 104. For example, the processor 108 may cause the user interface 104 to present a message alerting the user 106 about the new device, the network location of the new device, whether the new device should or should not be scanned, as well as the reasons why the new device should or should not be scanned.

This process may be iterated or otherwise performed at various intervals that may depend on the particular use case. For example, organizations that are highly regulated may want to know about new devices and new network segments as soon as possible. Accordingly, the system 100 may check for differences or updates every few minutes and schedule small, targeted, and thorough scans for new devices.

On the other hand, some organizations may be less concerned with immediately detecting and scanning new devices. In these scenarios, the system 100 may check for updates only once a day, for example.

After checking for devices, the processor 108 may set up a new or updated scan configuration in a disabled state so that it can be reviewed by a vulnerability assessment team before the vulnerability assessment device 120 executes a new scan with the new or updated scan configuration data. Reviewing the scan configuration data before a new scan is run may be useful in environments that have a device that, if scanned, may crash or otherwise negatively impact the network.

In some embodiments, a user 106 may first set up the system 100 by configuring the level three networking devices on the network 118 to emit netflow packets for collection. Specifically, an operator may configure collectors to aggregate netflow data and to send the data to a central data store. For example, the collectors may be configured to aggregate netflow data which may be column-oriented data files (e.g., parquet) on S3.

A user may then configure the system 100 to scan for new devices daily. For example, at midnight (or at some other time at which an organization's network traffic is low or otherwise won't be impaired by a scan), the system 100 may make a call to an SQL system (e.g., Athena) to incorporate any newly created files on, in this case, S3, from the past day (or other specified time period).

The system 100 may then make a call to the SQL system (e.g., Athena) to collect all internal/private IPs that are active in the netflow data during the past day (or other specified time period). The system 100 may then query the vulnerability assessment device 120 to collect all scan configurations.

The processor 108 may then compare the IPs from the SQL system (e.g., Athena) to the IPs from the vulnerability assessment device 120 to identify new IPs. Then, the classifier 112 may execute a classification model on data about the devices using the new IPs to segregate them into those that should be included in a new scan configuration and those that should be excluded from the new scan configuration.

The processor 108 may then instruct the vulnerability assessment device 120 to create a new scan configuration with the new IPs that are to be scanned. In some embodiments, the vulnerability assessment device 120 may then autonomously scan the newly-added devices.

In other embodiments, however, the processor 108 may first set the new scan configuration to be disabled. Then, the system 100 may send a message to users that are managing the vulnerability assessment device 120 to alert them that the new scan configuration should be reviewed. A reviewer may then enable the vulnerability assessment device 120 or reject the new scan configuration data.

Figure 3:
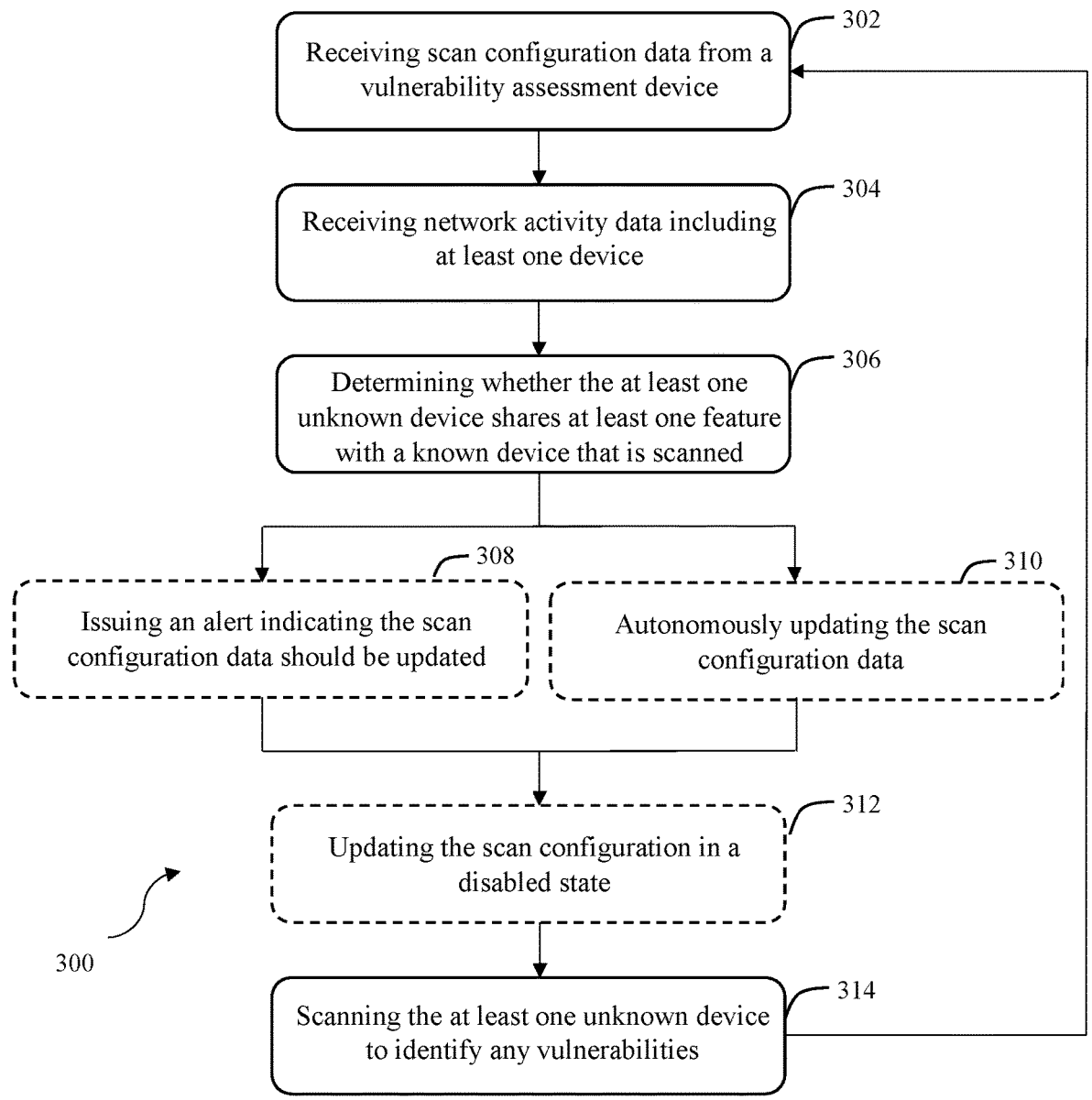
FIG. 3 depicts a flowchart of a method for identifying a network vulnerability in accordance with one embodiment.

FIG. 3 depicts a flowchart of method 300 for identifying a network vulnerability in accordance with one embodiment. Step 302 involves receiving, using an interface, scan configuration data from a vulnerability assessment device. The scan configuration data may include at least one device that is known to the vulnerability assessment device, whether the at least one known device is to be scanned by the vulnerability assessment device, and at least one feature related to the at least one known device.

The vulnerability assessment device may be similar to the vulnerability assessment device 120 of FIG. 1, and may be configured to scan known devices on a network. Moreover, the vulnerability assessment device may be configured to scan only devices that have one or more features indicating that they should be scanned. Accordingly, the vulnerability assessment device may be aware of devices on the network, and also aware that certain devices should not be scanned.

This scan configuration data may initially be gathered by the vulnerability assessment device, but may also be stored and received from one or more databases. For example, data regarding network traffic and devices on the network can be retrieved periodically and stored in one or more databases. The database(s) may store data regarding particular devices or IPs, such as features relating to the devices or IPs, and whether or not the devices or IPs should be scanned.

Accordingly, one of the advantages of the systems and methods described herein is that very little (if any) modification to existing vulnerability assessment devices is required. Rather, the features of the systems and methods described herein can be used in conjunction with any existing vulnerability assessment device.

Step 304 involves receiving, using the interface, network activity data including at least one device that is unknown to the vulnerability assessment device. As discussed previously, often times new network segments consisting of new IPs and devices may be added to a network. Security personnel, and vulnerability assessment devices themselves, may be unaware of the addition(s). Accordingly, the vulnerability assessment device will not scan these devices or IPs as it does not know these devices or IPs exist.

Step 304 may therefore involve relying on various data sources to receive data about one or more new (i.e., previously unknown) devices or IPs (for simplicity, "devices"). As discussed previously, the system 100 may rely on data from data sources such as ARP announcements, netflow records, data captured by firewalls, DNS, or the like.

Step 306 involves determining, using a processor executing instructions stored on a memory and providing a classifier, whether the at least one unknown device shares at least one feature with a known device that is scanned. Step 306 is performed to determine whether or not the new device should be scanned.

Accordingly, step 306 involves gathering features related to the new device. These features may include, but are not limited to, the set of ports receiving data on the device, the number of peers connected to the device, the volume of data sent by the device, the volume of data receive by the device, the busiest time period of the day for the device, and the least busy time period of the day for the device, or the like.

The feature(s) of the new device may then be compared to feature(s) of the known devices that are scanned. Basically, method 300 operates under the assumption that, if a new device is similar to a known device that is scanned (based on sharing one or more features), then the new device should be scanned as well.

The systems and methods described herein may be configured to adjust the level of similarity required in order for a new device to be considered "similar" to known devices that are scanned, and therefore should be included in the scan configuration. For example, a classifier such as the classifier 112 of FIG. 1 may require that the new device shares at least two features with devices that are scanned before classifying the new device as similar enough to be scanned.

Or, the classifier 112 may consider the totality of the features such that the presence of one feature may make up for the absence of another feature. For example, if the new device has a high number of the same ports receiving data as a known device that is scanned, this may be considered more important than and make up for the fact that the busiest time period of the new device is different than the busiest time period of the day of the known device(s). In other words, common features may be weighted differently such that a new device may be considered similar to a known device that is scanned, and therefore should be scanned as well, if it shares some features but not others.

Step 308 is optional and involves issuing an alert indicating the scan configuration data should be updated to include the unknown device. This alert may be communicated to a user via a user interface such as the user interface 104 of FIG. 1. The alert may be a visual alert, an audio alert, a haptic-based alert, or some combination thereof.

Accordingly, a user such as security personnel may be notified that a new device or IP was discovered, and that it should be scanned. The user may be presented with data such as the features associated with the new device and why the device should be scanned. The alert may also be presented with a confidence value that represents the classifier's confidence in its classification. The user may then decide to update the scan configuration data to include the new device.

Step 310 is optional and involves autonomously updating the scan configuration data. Rather than issuing an alert as in step 308, a processor such as the processor 108 may autonomously update the scan configuration data.

Step 312 is optional and involves updating the scan configuration data in a disabled state. Accordingly, the vulnerability assessment device will not scan the new device immediately, but instead a security team or user is able to first review the updated scan configuration data.

Step 314 involves scanning, using the vulnerability assessment device, the at least one unknown device to identify any vulnerabilities of the at least one unknown device after the processor determines the at least one unknown device shares at least one feature with a known device that is scanned. Accordingly, if the classifier determines that the new/unknown device shares at least one feature with a known device that is scanned, the classifier may scan the new device to detect any vulnerabilities. Accordingly, only devices that should be scanned are actually scanned. The steps of method 300 may be iterated or otherwise repeated at predetermined time intervals.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for identifying a network vulnerability, the method comprising:
receiving, using an interface, scan configuration data from a vulnerability assessment device, wherein the scan configuration data comprises
at least one device that is known to the vulnerability assessment device,
whether the at least one known device is scanned by the vulnerability assessment device, and
at least one feature related to the at least one known device;
receiving, using the interface, network activity data including at least one device that is unknown to the vulnerability assessment device;
determining, using a processor executing instructions stored on a memory and providing a classifier, whether the at least one unknown device shares at least one feature with a known device that is scanned;
scanning, using the vulnerability assessment device, the at least one unknown device to identify any vulnerabilities of the at least one unknown device after the processor determines the at least one unknown device shares at least one feature with a known device that is scanned; and
updating the scan configuration data in a disabled state and presenting the updated scan configuration data to an operator using a user interface before the vulnerability assessment device scans the at least one unknown device.

2. The method of claim 1, wherein
the at least one feature comprises at least one of a set of ports receiving data on the at least one known device, a number of peers connected to the at least one known device, a volume of data sent from the at least one known device, a volume of data received by the at least one known device, a busiest time period of day, and a least busy time period of day.

3. The method of claim 1, wherein
the network activity data is received from at least one of a Netflow record, an address resolution protocol announcement, a web proxy, a domain name server, and a firewall.

4. The method of claim 1, wherein
at least one device that is not scanned includes a printer.

5. The method of claim 1, wherein
at least one device that is not scanned includes a healthcare device.

6. The method of claim 1, further comprising:
iterating, at a predetermined time interval, the steps of:
receiving scan configuration data;
receiving network activity data including at least one unknown device;
determining whether the at least one unknown device shares at least one feature with at least one known device that is scanned; and
scanning the at least one unknown device to identify any vulnerabilities of the unknown device.

7. The method of claim 1, wherein
the classifier is a random forest or a support vector machine classifier.

8. The method of claim 1, further comprising:
issuing an alert using a user interface, wherein
the alert indicates that the scan configuration data should be updated to include the at least one unknown device.

9. The method of claim 1, further comprising:
autonomously updating the scan configuration data to include the at least one unknown device.

10. A system for identifying a network vulnerability, the system comprising:
an interface for receiving:
scan configuration data from a vulnerability assessment device, wherein
the scan configuration data comprises
at least one device that is known to the vulnerability assessment device,
whether the at least one known device is scanned by the vulnerability assessment device, and
at least one feature related to the at least one known device; and
network activity data including at least one device that is unknown to the vulnerability assessment device; and
a processor executing instructions stored on a memory and providing a classifier,
wherein the processor is configured to:
determine whether the at least one unknown device shares at least one feature with at least one known device that is scanned,
wherein
the vulnerability assessment device is configured to scan the unknown device to identify any vulnerabilities of the at least one unknown device after the processor determines the at least one unknown device shares at least one feature with a known device that is scanned, and
update the scan configuration data in a disabled state and present the updated scan configuration data to an operator using a user interface before the vulnerability assessment device scans the at least one unknown device.

11. The system of claim 10, wherein
the at least one feature comprises at least one of a set of ports receiving data on the at least one known device, a number of peers connected to the at least one known device, a volume of data sent from the at least one known device, a volume of data received by the at least one known device, a busiest time period of day, and a least busy time period of day.

12. The system of claim 10, wherein
the network activity data is received from at least one of a Netflow record, an address resolution protocol announcement, a web proxy, a domain name server, and a firewall.

13. The system of claim 10, wherein
at least one device that is not scanned includes a printer.

14. The system of claim 10, wherein
at least one device that is not scanned includes a healthcare device.

15. The system of claim 10, wherein
the system is configured to, at a predetermined time interval,
receive scan configuration data,
receive network activity data including at least one unknown device,
determine whether the at least one unknown device shares at least one feature with a known device that is scanned, and
scan the at least one unknown device to identify any vulnerabilities of the unknown device.

16. The system of claim, 10 wherein
the classifier is a random forest or a support vector machine classifier.

17. The system of claim, 10 wherein
the processor is further configured to issue an alert using a user interface, wherein
the alert indicates that the scan configuration data should be updated to include the at least one unknown device.

18. The system of claim 10, wherein
the processor is configured to autonomously update the scan configuration data to include the at least one unknown device.

\* \* \* \* \*